•64-10?  S?
5/12/87  09  RE 32,415

United States Patent [19]

Grech

[11] E Patent Number: Re. 32,415

[45] Reissued Date of Patent: May 12, 1987

[54] ADJUSTABLE POWER TRANSMITTING DEVICE

[76] Inventor: Leonard Grech, P.O. Box 2774, Capistrano Beach, Calif. 92624

[21] Appl. No.: 577,492

[22] Filed: Feb. 6, 1984

Related U.S. Patent Documents

Reissue of:

[64] Patent No.: 4,332,147
Issued: Jun. 1, 1982
Appl. No.: 130,832
Filed: Mar. 17, 1980

[51] Int. Cl.[4] ..... F16D 3/32

[52] U.S. Cl. ..... 464/109; 173/163; 403/287; 408/127; 409/216; 464/171; 464/177

[58] Field of Search ..... 74/423, 424, 713; 81/57.26; 173/40, 41, 42, 140, 163, 164; 279/5; 403/287; 408/127; 409/211, 216; 464/113, 106, 109, 171, 173, 177

[56] References Cited

U.S. PATENT DOCUMENTS

| | | | |
|---|---|---|---|
| 1,759,726 | 5/1930 | Zigenheim | 173/40 |
| 2,277,369 | 3/1942 | Schultz et al. | 464/109 X |
| 2,310,759 | 2/1943 | Clawson | 173/163 |
| 2,410,811 | 11/1946 | Dawson | 464/113 X |
| 2,414,637 | 1/1947 | Crump | 408/127 X |
| 2,546,655 | 3/1951 | Shaler | 173/163 |
| 2,791,142 | 5/1957 | Lyon | 81/57.26 |
| 2,813,409 | 11/1957 | Wolcott | 464/113 X |
| 3,456,458 | 7/1969 | Dixon | 464/109 |
| 3,483,796 | 12/1969 | Galbarini et al. | 409/216 |

FOREIGN PATENT DOCUMENTS 903569 8/1962 United Kingdom .

*Primary Examiner*—Daniel P. Stodola
*Attorney, Agent, or Firm*—Gordon L. Peterson

[57] ABSTRACT

An adjustable power transmitting device comprising a rotary input shaft mounted for rotation about a first axis and an output shaft mounted for rotation about a second axis. The output shaft is also mounted for pivotal movement about at least two non-parallel axes so that the position of the output shaft can be adjusted about both of these axes. The input shaft is drivingly coupled to the output shaft so that the input shaft can rotate the output shaft in all positions of the output shaft about the two non-parallel axes.

23 Claims, 5 Drawing Figures

ADJUSTABLE POWER TRANSMITTING DEVICE

Matter enclosed in heavy brackets [ ] appears in the original patent but forms no part of this reissue specification; matter printed in italics indicates the additions made by reissue.

BACKGROUND OF THE INVENTION

At times, it is necessary or desirable to use a hand-held motor driven drill to drill a hole in a relatively inaccessible location. The conventional hand-held motor driven drill does not provide for adjusting the angle of the drill bit relative to the body of the drill and so the workman must maintain the drill body in an orientation which is established by the axis of the hole to be drilled. This can prevent use of the drill or make use of the drill much more cumbersome because the structure which makes the drilled region relatively inaccessible may prevent or impede movement of the drill body in a way to allow the hole to be properly drilled.

Adjustable hand-driven drills are known and are shown in Zigenheim U.S. Pat. No. 1,759,726, Clawson U.S. Pat. No. 2,310,759 and Shaler U.S. Pat. No. 2,546,655. Each of these patents shows a drill in which the chuck for holding the drill bit can be adjusted about one axis. Each of these constructions is subject to several disadvantages, including being hand driven and being incapable of being adjusted about more than one axis.

SUMMARY OF THE INVENTION

This invention provides an adjustable power transmitting device for rotary motion which is adjustable about at least two non-parallel adjustment axes. Although the power transmitting device is particularly adapted for use with a hand-held, motor driven drill, it can be utilized for other power tools, such as wrenches. The invention also incorporates a drive train which is particularly advantageous in driving a rotary output member which is adjustable about one or more pivot or adjustment axes. In addition, the present invention incorporates features which allow the rotary output shaft to be pivoted about one or more adjustment axes without significant loss of lubricant.

With respect to the multiple axis adjustment feature, the adjustable power transmitting device may include a rotary input shaft mounted for rotation about a first rotational axis and a rotary output shaft mounted for rotation about a second rotational axis. The rotary output shaft is also mounted for pivotal movement about at least two non-parallel adjustment axes so that the position of the output shaft can be adjusted. Means is provided for fixing the output shaft in any one of a plurality of positions about the adjustment axes.

The input shaft is drivingly coupled to the output shaft so that the input shaft can rotate the output shaft in all positions of the output shaft about the two adjustment axes. Preferably, a first of the adjustment axes is substantially parallel to the first rotational axis, and the second of the adjustment axes is substantially transverse to the first adjustment axis.

In order to drivingly couple the input and output shafts, an input gear is coupled to the input shaft, an output gear is coupled to the output shaft, and an intermediate gear drivingly engages the input gear and the output gear. This arrangement of gears allows the output shaft to be pivoted about a first adjustment axis which may, for example, be coincident with the axis of rotation of the intermediate gear. By utilizing bevel gears, good contact among the teeth of the several gears is maintained throughout the full range of adjustment positions of the output shaft.

If desired, a second intermediate gear can be provided for drivingly engaging the input gear and the output gear. One advantage of utilizing a second intermediate gear is that the position of the output shaft about the first adjustment axis is fixed by this combination of gears. Conversely, to change the position of the output shaft about the first adjustment axis, it is necessary to disengage one of the intermediate gears from the input and output gears. This can advantageously be accomplished by using releasable means for holding the second intermediate gear in driving engagement with the input and output gears and biasing means for urging the second intermediate gear out of driving engagement with the input and output gears. Accordingly, upon release of the releasable means, the biasing means automatically disengages the intermediate gear from the input and output gears.

Preferably, a housing is provided for housing at least portions of the input and output shafts and the gears. The housing protects these components and can serve as a containing means for grease or other lubricant. Also, by mounting the output shaft on the housing and mounting the housing for pivotal movement about a second adjustment axis, the output shaft is correspondingly mounted for pivotal movement about the second adjustment axis.

In order to accommodate movement of the output shaft about the first adjustment axis, the housing includes opening means in the form of an elongated slot through which the output shaft can project. If the housing is to contain a lubricant, such as grease, the present invention provides for substantially closing the opening in all positions of the output shaft about the first adjustment axis. For example, this can advantageously be accomplished by using a collapsible curtain on one side of the output shaft and a second curtain on the other side of the output shaft. The two curtains cooperate in all positions of the output shaft about the first adjustment axis for closing the opening means.

Tool mounting means, such as a chuck for mounting a drill bit or other tool holder, can be suitably mounted on the output shaft for rotation with the output shaft. The adjustable power transmitting device can be integrally incorporated into the body of a motor-driven drill or other motor-driven tool or it can be provided as a separate entity and adapted for retrofit onto the motor-driven tool.

When the adjustable power transmitting device is incorporated integrally into a motor-driven tool, it advantageously includes a compact and efficient gear-reduction mechanism. The gear-reduction mechanism may include a first pinion for receiving rotary input motion from the motor, a second pinion driven by the first pinion, and a ring gear driven by the second pinion and coupled to the input shaft.

The invention, together with further features and advantages thereof, may best be understood by reference to the following description taken in connection with the accompanying illustrative drawings which are somewhat schematic.

DESCRIPTION OF THE PREFERRED EMBODIMENT

Figure 1:
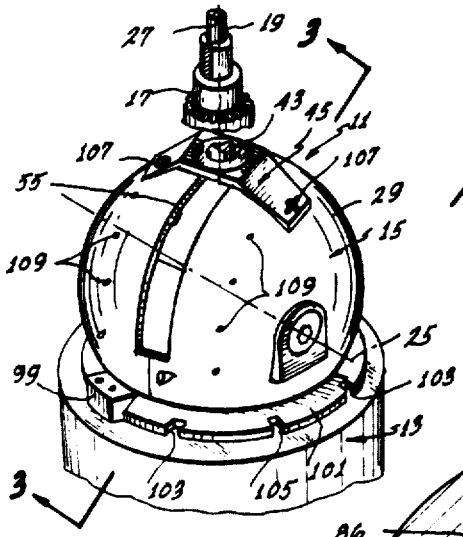
FIG. 1 is a frgmentary perspective view of a drill constructed in accordance with the teachings of this invention with portions of the chuck broken away to expose the output shaft.

FIG. 1 shows a drill 11 which generally includes a drill body 13, an adjustable power transmitting device 15 and a chuck 17 for holding a drill bit 19. The drill body 13 may be a conventional hand-held motor-driven drill which includes a motor 21 for driving a shaft 23 in rotation. The shaft 23 is mounted by a sealed bearing 24 carried by a plate or wall 26 of the drill body 13.

The adjustable power transmitting device 15 mounts the chuck 17 for pivotal movement about two mutually perpendicular pivot or adjustment axes 25 and 27. The device 15 also transmits rotary motion from the shaft 23 to the chuck 17 so that the drill bit 19 can be rotated. This power transmitting function can occur in all angular positions of the chuck 17 about the adjustment axes 25 and 27.

Figure 2:
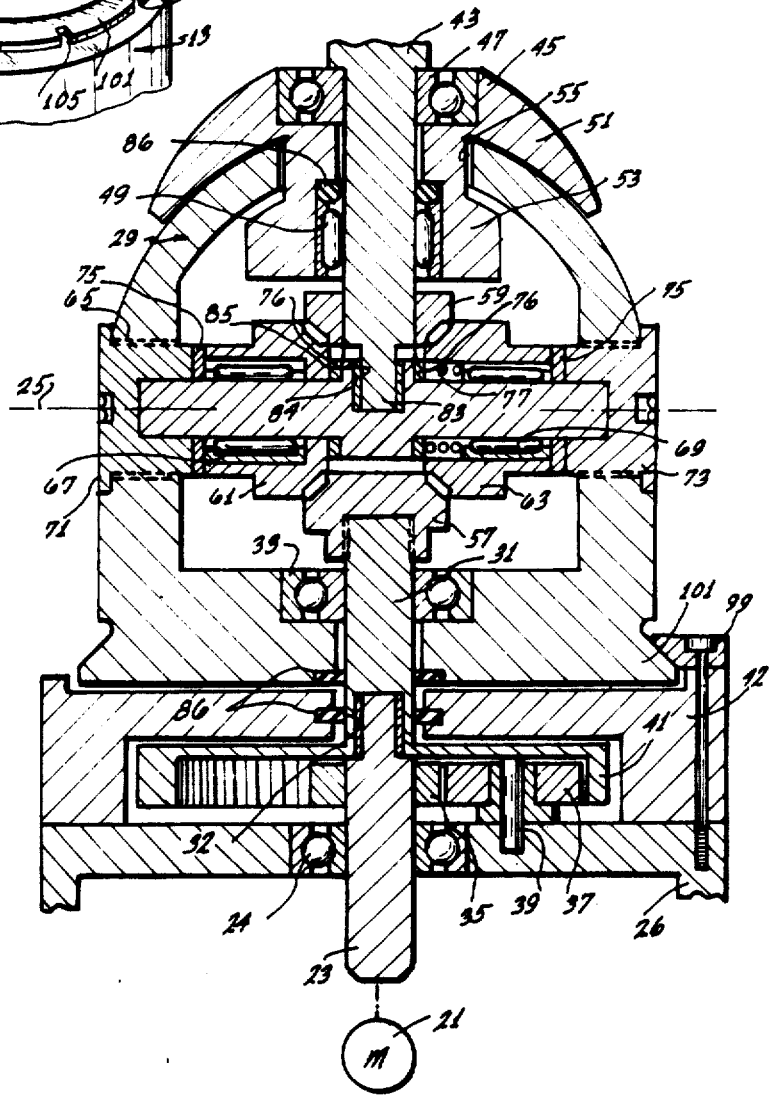
FIG. 2 is a longitudinal sectional view of the construction shown in FIG. 1.

With reference to FIG. 2, the device 15 includes a rounded or curved housing 29, which may be constructed of two half shells, mounted on the drill body 13 as described hereinbelow. The device 15 includes an input shaft 31 rotatably mounted on the housing 29 for rotational movement about a first rotational axis which coincides with the longitudinal axis of the input shaft 31 by a ball bearing 33, the shaft 23 and a bearing 32. The shaft 23 drives the input shaft 31 through a gear reduction unit which comprises a first pinion 35 keyed or otherwise fixed to the shaft 23, a second pinion 37 suitably rotatably mounted on the plate 26 of the drill body 13 by a bearing and shaft assembly 39 and driven by the first pinion 35, and a ring gear 41 driven by the second pinion and coupled to, or integral with, the input shaft 31. The gear reduction unit also includes a gear housing 42 mounted on the wall 26 and housing the pinions 35 and 37 and the ring gear 41.

An output shaft 43 is rotatably mounted on a carrier 45 in any suitable manner, such as by a ball bearing 47 and a needle bearing 49. The carrier 45 is in turn mounted on the housing 29 by spaced opposed flanges 51 and 53 for slidable movement in opening means in the form of a slot 55 in the housing 29.

The input shaft 31 drives the output shaft 43 via an input bevel gear 57 keyed or otherwise secured to the input shaft 31, an output bevel gear 59 suitably mounted on the output shaft 43, and opposed intermediate bevel gears 61 and 63. The intermediate gears 61 and 63 drivingly engage the input gear 57 and the output gear 59. In the embodiment illustrated, the intermediate gears 61 and 63 are mounted on a mounting shaft 65 which is pivotally mounted on the opposite sides of the housing 29. The mounting shaft 65 extends through the intermediate gears 61 and 63, and needle bearings 67 and 69 mount the gears 61 and 63 for rotation, respectively, on the shaft 65.

Releasable means in the form of set screws 71 and 73 bears against thrust bearings 75 to normally hold the intermediate gears 61 and 63 in driving engagement with the gears 57 and 59 and against thrust bearings 76. A coil compression spring 77 acts between one of the thrust bearings 76 and the bearing 69 to resiliently urge the intermediate gear 63 out of driving engagement with the gears 57 and 59. Accordingly, upon loosening of the set screw 73, the spring 77 automatically disengages the intermediate gear 63 from the gears 57 and 59.

The output shaft 43 has an inner end portion 83 which projects through the output gear 59 and is received within a bearing 84 mounted in a blind bore 85 in the mounting shaft 65. The mounting shaft 65 is mounted for pivotal movement about the adjustment axis 25 by coaxial blind bores in the set screws 71 and 73. The adjustment axis 25 coincides with the longitudinal axis of the mounting shaft 65. The adjustment axis 25, in the embodiment illustrated, is perpendicular to the axis of rotation of the input shaft 31. By releasing the set screw 73 to disengage the intermediate gear 63 from the gears 57 and 59, the output shaft 43 can be pivoted about the adjustment axis 25 to a desired angular position. In the embodiment illustrated, the output shaft 43 can be adjusted through 90 degrees from a position in which the output shaft 43 is coaxial with the input shaft 31. Of course, the slot 55 is configured to accommodate this pivotal movement of the output shaft 43.

Figure 3:
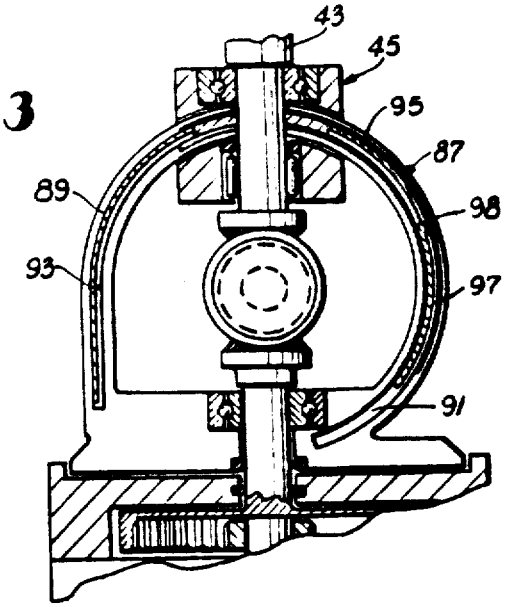
FIG. 3 is a view taken generally along line 3—3 of FIG. 1.
Figure 4:
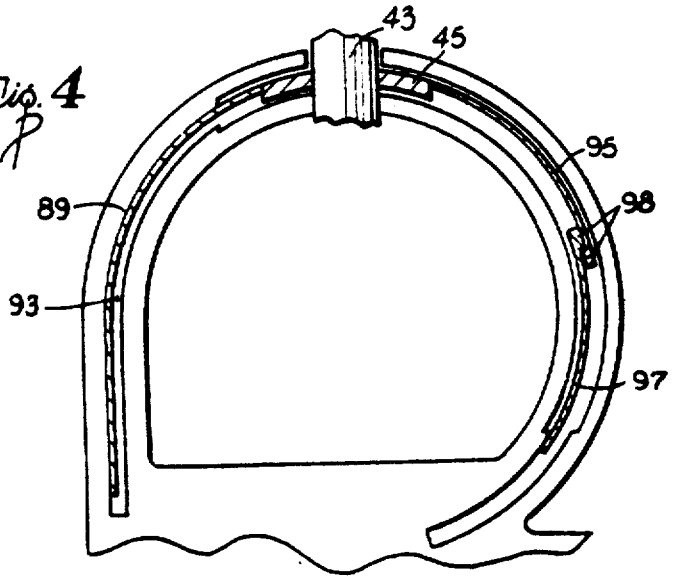
FIG. 4 is an enlarged fragmentary view similar to FIG. 3 with parts omitted and illustrating the curtains for progressively opening and closing the slot which accommodates angular movement of the output shaft.

The interior of the housing 29 can be filled with a suitable lubricant, such as grease. Seals 86 prevent leakage of lubricant out of the housing 29 along the input shaft 31 and the output shaft 43, respectively. To prevent loss of the lubricant through the slot 55, it is desirable to close the slot 55 as much as possible for all angular positions of the output shaft 43 about the adjustment axis 25. In the embodiment illustrated, this is accomplished by a collapsable curtain 87 (FIGS. 3 and 4) and a curtain 89 which are normally slidably retained in pockets 91 and 93, respectively. The collapsable curtain 87 includes curtain segments 95 and 97 having engageable interlocking shoulders 98. One end of the curtain segment 95 is coupled to the carrier 45. The leading edge of the curtain 89 is coupled to the opposite end of the carrier 45. As the output shaft 43 and the carrier 45 are pivoted clockwise as viewed in FIG. 4 about the adjustment axis 25, the curtain segment 95 slides over the curtain segment 97, and the curtain 89 is pulled out of the pocket 93 to cover the portions of the slot 55 to the left of the output shaft 43. If clockwise pivotal movement of the output shaft 43 continues, the upper end of the curtain segment 97 engages the carrier 45 and is pushed thereby further into the pocket 91 as required to accommodate this pivotal movement of the output shaft. On the return pivotal movement of the output shaft 43, the steps described above are reversed, with the curtain 89 being pushed back into its pocket 93 to accommodate such motion of the output shaft and with the curtain segments 95 and 97 being pulled out of the pocket 93 and expanding as permitted by the engageable shoulders 98 to cover the portion of the slot 55 to the right of the output shaft 43 as viewed in FIG. 4.

If pivotal movement of the output shaft 43 about the adjustment axis 27 is desired, this can advantageously be provided by mounting of the housing 29 on the drill body 13 for rotational movement. Although this can be accomplished in different ways, in the embodiment illustrated, a plurality of guide segments 99 (only one being illustrated) is mounted on the drill body 13 for cooperation with a flange 101 on the housing to permit this relative motion. In the embodiment illustrated, the adjustment axis 27 is coincident with the axis of rotation of the input shaft 31.

The position of the output shaft 43 about the axis 25 and the position of the housing 29 about the adjustment axis 27 can be fixed in various different ways. For example, the flange 101 (FIG. 1) may have notches 103 arranged in a pattern along the periphery of the flange. The angular position of the housing 29 and hence the output shaft 43 can be fixed by one or more locking elements 105 mounted on the gear housing 42. For example, each of the locking elements 105 may be in the form of a pin, threaded fastener or spring biased detent which can be resiliently retracted within the gear housing 42. In any event, the locking element 105 can be effectively removed from the notch 103 to allow the housing 29 to be rotated about the adjustment axis 27 to the desired angular position and, thereafter, the locking element 105 can be appropriately reinserted into the confronting notch 103.

In the embodiment illustrated, the carrier 45 and hence the output shaft 43 can be incrementally pivoted about the adjustment axis 25. The region of the housing 29 which is swept by the carrier 45 is preferably spherical. The carrier 45 can be fixed in any one of a number of locations by spring biased detents 107 of conventional construction which are carried by the carrier 45 and which may be received within recesses 109 of the housing 29. The recesses 109 preferably do not completely penetrate the housing as this would provide a potential opening for lubricant to leak out of the housing.

Figure 5:
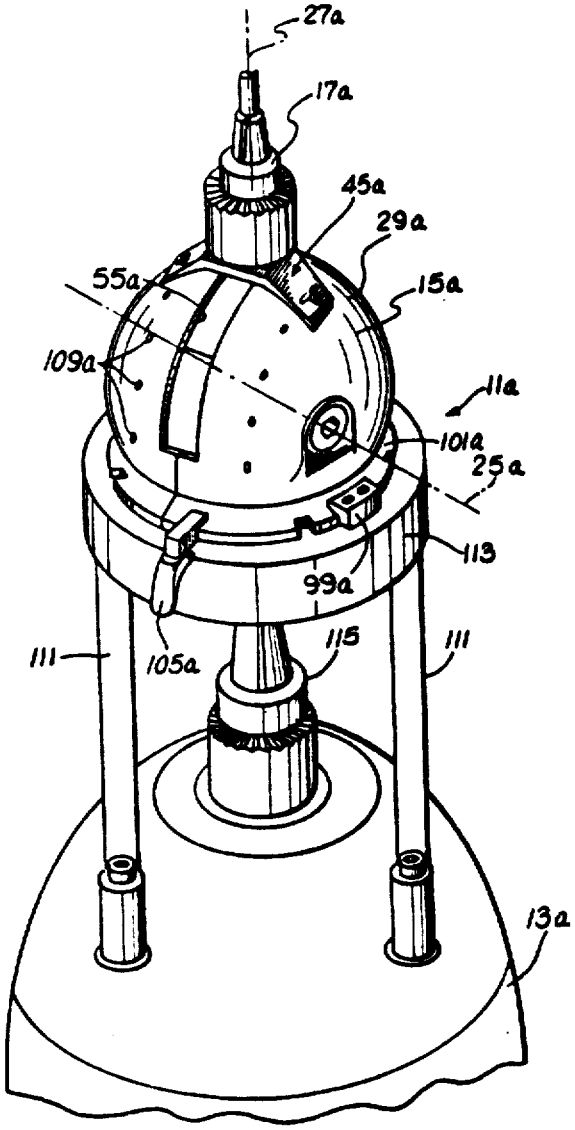
FIG. 5 is an isometric view illustrating one way in which the power transmitting device of this invention can be retrofit onto an existing power tool.

FIG. 5 shows a drill 11a which is identical to the drill 11 in all respects not shown or described herein. The primary differences between the drill 11 and the drill 11a is that the latter has the adjustable power transmitting device 15a retrofit on an existing drill 13a and the power transmitting device 15a does not include the gear reduction mechanism, i.e., the pinions 35 and 37 and the gear 41. Portions of the drill 11a corresponding to portions of the drill 11 are designated by corresponding reference numerals followed by the letter "a."

In the embodiment illustrated, the retrofit is structurally accomplished by mounting rods 111 which are attached to the drill body 13a and to a base plate 113 of the device 15a. The drill body 13a includes the usual rotatable chuck 115. Rotary input is provided to the device 15a by inserting the shaft 23 (FIG. 2) into the chuck 115.

The housing 29a can be pivoted about the adjustment axis 27a relative to the base plate 113 as permitted by the guide segments 99a and the locking elements 105a (only one being shown in FIG. 5). Although the locking elements 105a can be identical to the locking elements 105 described hereinabove, as illustrated in FIG. 5, each of the locking elements includes a toggle latch which can be secured in place within an associated one of the notches 103a. Adjustment of the chuck 17a about the adjustment axis 25a can be accomplished with the construction of FIG. 5 in the same manner described above with reference to FIGS. 1–4.

Although an exemplary embodiment of the invention has been shown and described, many changes, modifications and substitutions may be made by one having ordinary skill in the art without necessarily departing from the spirit and scope of this invention.

I claim:

1. An adjustable power transmitting device for rotary motion comprising:

a rotary input shaft;

means for mounting the input shaft for rotation about a first rotational axis;

a rotary output shaft;

means for mounting the output shaft for rotation about a second rotational axis;

second means for mounting the output shaft for pivotal movement about at least two non-parallel adjustment axes whereby the position of the output shaft can be adjusted;

means for fixing said output shaft in any one of a plurality of positions about said adjustment axes;

means for drivingly coupling the input shaft to the output shaft whereby the input shaft can rotate the output shaft in all positions of the output shaft about the two adjustment axes;

said coupling means includes an input gear coupled to said input shaft, an output gear coupled to said output shaft and an intermediate gear [drivingly] *directly* engaging said input gear and said output gear, and means for mounting said intermediate gear for rotation; and said intermediate gear being a first intermediate gear and said coupling means includes a second intermediate gear drivingly engaging said input gear and said output gear, means for mounting said second intermediate gear for rotation, a first of said adjustment axes being perpendicular to said first rotational axis, and said two intermediate gears holding the output shaft against pivotal movement about said first adjustment axis, *and said coupling means allowing said input shaft to rotate said output shaft even when the position of the output shaft is being adjusted about at least one of said adjustments axes.*

2. An adjustable power transmitting device as defined in claim 1 including means for releasably holding said second intermediate gear in driving engagement with said input gear and said output gear and means for biasing said second intermediate gear out of driving engagement with said input gear and said output gear whereby upon release of the releasable means said biasing means automatically disengages said intermediate gear from said input gear and said output gear.

3. An adjustable power transmitting device for rotary motion comprising:

a rotary input shaft;

means for mounting the input shaft for rotation about a first rotational axis;

a rotary output shaft;

means for mounting the output shaft for rotation about a second rotational axis;

second means for mounting the output shaft for pivotal movement about at least two non-parallel adjustment axes whereby the position of the output shaft can be adjusted;

means for fixing said output shaft in any one of a plurality of positions about said adjustment axes;

means for drivingly coupling the input shaft to the output shaft whereby the input shaft can rotate the output shaft in all positions of the output shaft about the two adjustment axes;

a first of said adjustment axes is substantially parallel to said first rotational axis and a second of said adjustment axes is substantially transverse to said first adjustment axis; and a housing at least partially containing *said input shaft*, said output shaft and said coupling means, *said input shaft terminating in said housing, said housing substantially enclosing said coupling means on all sides thereof*, said second means includes means for mounting said output shaft on said housing for pivotal movement about said [first] *second* adjustment axis relative to said housing and means for mounting said housing for pivotal movement about the [second] *first* adjustment axis to thereby mount the output shaft for pivotal movement about said [second] *first* adjustment axis.

4. An adjustable power transmitting device as defined in claim 3 wherein said [housing at least partially contains said shafts and said gears] *coupling means includes a gear and*, said [second] *means* mounting [means] *the output shaft for pivotal movement* includes a mounting shaft carried by said housing and extending through said [intermediate] gear, said mounting shaft mounting said output shaft for pivotal movement about said [first] *second* adjustment axis relative to said housing.

5. An adjustable power transmitting device as defined in claim 3 wherein said housing has opening means to accommodate the movement of the output shaft about the [first] *second* adjustment axis relative to the housin1g, said housing is adapted to retain a lubricant, said opening means includes an elongated slot in said housing and means for substantially closing said opening means in all positions of said output shaft about said [first] *second* adjustment axis.

6. An adjustable power transmitting device as defined in claim 5 including tool mounting means on [said] *an* outer end of said output shaft.

7. An adjustable power transmitting device for rotary motion comprising:

a rotary input shaft;

means for mounting the input shaft for rotation about a first rotational axis;

a rotary output shaft having an outer end;

means for mounting the output shaft for rotation about a second rotational axis;

second means for mounting the output shaft for pivotal movement about at least two non-parallel adjustment axes to permit the output shaft to be adjusted about said adjustment axes so that said outer end can describe a segment of a sphere;

means for fixing said output shaft in any one of a plurality of positions about said adjustment axes in which said outer end lies in said segment of a sphere; [and]

means for drivingly coupling the input shaft to the output shaft whereby the input shaft can rotate the output shaft in all of said positions of the output shaft about the adjustment axes[.]*; and*

*said coupling means including an input gear coupled to said input shaft, an output gear coupled to said output shaft and an intermediate gear directly engaging said input gear and said output gear, and means for mounting said intermediate gear for rotation, and said coupling means allowing said input shaft to rotate said output shaft even when the position of the output shaft is being adjusted about at least one of said adjustment axes.*

8. An adjustable power transmitting device as defined in claim 7 including gear reduction means coupled to said input shaft and including a first pinion for receiving rotary input motion, a second pinion driven by said first pinion and a ring gear driven by said second pinion and coupled to said input shaft.

9. An adjustable power transmitting device for use with a motor driven tool comprising:

a housing;

a rotary input shaft;

means for mounting the input shaft for rotation about a first axis with at least a portion of the input shaft being within said housing;

a rotary output shaft;

first means for mounting the output shaft for rotation about a second axis with one portion of the output shaft being within said housing and an outer portion of the output shaft being outside of said housing;

tool mounting means on said outer portion of said output shaft;

an input gear mounted on and driven by said input shaft;

an output gear mounted on said output shaft;

an intermediate gear mounted for rotation within said housing for [drivingly] *directly* engaging said input gear and said output gear;

said output shaft having an inner end portion within said housing projecting through said output gear;

means within said housing and cooperating with said inner end portion of said output shaft for mounting the output shaft for pivotal movement relative to the housing about a first pivot axis;

said housing having opening means therein for accommodating said output shaft as it pivots about said first pivot axis; and means for fixing said output shaft in any one of a plurality of positions about said first pivot axis.

10. An adjustable power transmitting device as defined in claim 9 wherein said intermediate gear is a first intermediate gear and including a second intermediate gear mounted for rotation within said housing and drivingly engageable with the input gear and the output gear.

11. An adjustable power transmitting device as defined in claim 10 wherein said means for mounting said output shaft for movement about the first pivot axis includes a mounting shaft mounted on said housing, said intermediate gear being mounted for rotation on said mounting shaft, said mounting shaft mounts said second intermediate gear for rotation, releasable means for normally holding said second intermediate gear in driving engagement with said input gear and said output gear and resilient means for urging said second intermediate gear out of driving engagement with said input gear and said output gear.

12. An adjustable power transmitting device as defined in claim 9 wherein said housing is adapted to retain a lubricant, said opening means includes an elongated slot in said housing and means for substantially closing said opening means in all positions of said output shaft about said pivot axis.

13. An adjustable power transmitting device as defined in claim 12 wherein said closing means includes a collapsible curtain on one side of said output shaft and a second curtain on the other side of said output shaft.

14. An adjustable power transmitting device as defined in claim 9 wherein said tool mounting means includes a chuck carried by said output shaft and adapted to mount a drill bit.

15. An adjustable power transmitting device as defined in claim 9 wherein said housing is arcuate at least adjacent said opening means.

16. An adjustable power transmitting device as defined in claim 9 including means for mounting said housing on the motor driven tool.

*17. An adjustable power transmitting device as defined in claim 7 wherein said input gear engages the intermediate gear on one side of a second of said adjustment axes and said output gear engages the intermediate gear on the other side of the second adjustment axis at least when said input and output shafts extend generally in the same direction and said second adjustment axis is generally transverse to the first rotational axis.*

*18. An adjustable power transmitting device as defined in claim 7 wherein said second mounting means includes a mounting shaft carried by said housing and extending through said intermediate gear.*

*19. An adjustable power transmitting device as defined in claim 7 wherein a second of said axes adjustment axis is generally transverse to the first rotational axis and said intermediate gear is mounted for rotation generally about said second adjustment axis.*

*20. An adjustable power transmitting device for rotary motion comprising:*

*a rotary input shaft;*

*means for mounting the input shaft for rotation about a first rotational axis;*

*a rotary output shaft having an outer end;*

*means for mounting the output shaft for rotation about a second rotational axis;*

*second means for mounting the output shaft for pivotal movement about at least two non-parallel adjustment axes to permit the output shaft to be adjusted about said adjustment axes so that said outer end can describe a segment of a sphere;*

*means for fixing said output shaft in any one of a plurality of positions about said adjustment axes in which said outer end lies in said segment of a sphere;*

*means for drivingly coupling the input shaft to the output shaft whereby the input shaft can rotate the output shaft in all of said positions of the output shaft about the adjustment axes;*

*said coupling means includes an input gear coupled to said input shaft, an output gear coupled to said output shaft and intermediate gear means drivingly coupled to said input gear and said output gear, and means for mounting said intermediate gear means for rotation; and*

*said input gear engaging the intermediate gear means on one side of a second of said adjustment axes and said output gear engaging the intermediate gear means on the other side of the second adjustment axis at least when said input and output shafts extend generally in the same direction and said second adjustment axis being generally transverse to the first rotational axis, and said coupling means allowing said input shaft to rotate said output shaft even when the position of the output shaft is being adjusted about at least one of said adjustment axes.*

*21. An adjustable power transmitting device for rotary motion comprising:*

*a rotary input shaft;*

*means for mounting the input shaft for rotation about a first rotational axis;*

*a rotary output shaft;*

*means for mounting the output shaft for rotation about a second rotational axis;*

*second means for mounting the output shaft for pivotal movement about at least two non-parallel adjustment axes whereby the position of the output shaft can be adjusted;*

*means for fixing said output shaft in any one of a plurality of positions about said adjustment axes;* means for drivingly coupling the input shaft to the output shaft whereby the input shaft can rotate the output shaft in all positions of the output shaft about the two adjustment axes;

*a first of said adjustment axes is substantially parallel to said first rotational axis and a second of said adjustment axes is substantially transverse to said first adjustment axis; and*

*a housing at least partially containing said shafts and said coupling means, said input shaft terminating in said housing, said housing surrounding said coupling means and a region of said output shaft, said second means includes means for mounting said output shaft on said housing for pivotal movement about said second adjustment axis relative to said housing and without pivoting said housing about said second adjustment axis and means for mounting said housing for pivotal movement about the first adjustment axis to thereby mount the output shaft for pivotal movement about said second adjustment axis.*

*22. An adjustable power transmitting device for rotary motion comprising:*

*means defining a rotary input;*

*means for mounting the rotary input for rotation about a first rotational axis;*

*means defining a rotary output having an outer end;*

*means for mounting the rotary output for rotation about a second rotational axis;*

*second means for mounting the rotary output for pivotal movement about at least two non-parallel adjustment axes to permit the rotary output to be adjusted about said adjustment axes so that said outer end can describe a segment of a sphere;*

*means for fixing said rotary output in any one of a plurality of positions about said adjustment axes in which said outer end lies in said segment of a sphere;*

*means for drivingly coupling the rotary input to the rotary output whereby the rotary input can rotate the rotary output in all of said positions of the rotary output about the adjustment axes; and*

*said coupling means including an input gear coupled to and coaxial with said rotary input, an output gear coupled to and coaxial with said rotary output and an intermediate gear directly engaging said rotary input and said rotary output, and means for mounting said intermediate gear for rotation, and said coupling means allowing said input shaft to rotate said output shaft even when the position of the output shaft is being adjusted about at least one of said adjustment axes.*

*23. An adjustable power transmitting device as defined in claim 22 including a second intermediate gear coaxial with said intermediate gear and drivingly engaging the rotary input and the rotary output.*

* * * * *